United States Patent [19]

Hokamura et al.

[11] 3,819,551

[45] June 25, 1974

[54] METHOD FOR CURING UNSATURATED EPOXY-ESTER RESINOUS COMPOSITIONS USING AN ORGANIC IMIDE TO CONTROL POT-LIFE

[75] Inventors: Sadakazu Hokamura, Yamato; Teruhisa Akaoka; Toshiaki Hanyuda, both of Yokohama, all of Japan

[73] Assignee: Showa High Polymer Co., Ltd., Tokyo, Japan

[22] Filed: Jan. 26, 1972

[21] Appl. No.: 221,101

[30] Foreign Application Priority Data

Jan. 27, 1971 Japan.................................. 46-2386

[52] U.S. Cl.......... 260/23 EP, 260/18 EP, 260/32.4, 260/32.6 R, 260/45.8 N, 260/45.85 N, 260/47 EC, 260/78.4 EP
[51] Int. Cl.............................................. C08g 30/10
[58] Field of Search........ 260/18 EP, 23 EP, 837 R, 260/78.4 EP, 32.6 R, 32.4, 47 EC, 47 EN, 45.8 N, 45.8 SN

[56] References Cited
UNITED STATES PATENTS

| | | | |
|---|---|---|---|
| 2,574,987 | 11/1951 | Shelley | 260/45.8 |
| 3,193,520 | 7/1965 | Caldo | 260/45.8 |
| 3,297,795 | 1/1967 | Peter et al. | 260/45.8 |
| 3,408,422 | 10/1968 | May | 260/837 |
| 3,420,914 | 1/1969 | May | 260/837 |
| 3,506,624 | 4/1970 | Behrens | 260/23 |
| 3,506,736 | 4/1970 | Najvar | 260/78.4 |
| 3,520,847 | 7/1970 | Runge et al. | 260/45.8 |
| 3,597,410 | 8/1971 | Lieske et al. | 260/78.4 |
| 3,634,542 | 1/1972 | Dowd et al. | 260/78.4 |
| 3,657,387 | 4/1972 | Stahly et al. | 260/45.8 |

*Primary Examiner*—Donald E. Czaja
*Assistant Examiner*—Eugene C. Rzuciolo
*Attorney, Agent, or Firm*—Wenderoth, Lind & Ponack

[57] ABSTRACT

This invention relates to an improvement of a method for curing unsaturated epoxy-ester resinous compositions and the improvement is achieved by using (1) one or more organic peroxides together with (2) one or more organic metal salts and (3) one or more organic imide compounds which are incorporated with the unsaturated epoxy-ester resinous compositions.

2 Claims, No Drawings

METHOD FOR CURING UNSATURATED EPOXY-ESTER RESINOUS COMPOSITIONS USING AN ORGANIC IMIDE TO CONTROL POT-LIFE

DETAILED EXPLANATION OF INVENTION

This invention relates to a method for curing unsaturated epoxy-ester resinous compositions, by which the pot life of the unsaturated epoxy-ester resinous compositions can be freely controlled, characterized by using (1) one or more organic peroxides together with (2) one or more organic metal salts and (3) one or more organic imide compounds. The unsaturated epoxy-ester resinous compositions are disclosed in the Japanese Patent Publication Nos. 31472/1969, 31836/1969, 1465/1970, 15988/1970 and 40069/1970, and the co-pending Japanese Application No. 14702/1967. The term "unsaturated epoxy-ester resinous compositions" used herein indicates the reaction products of epoxy compounds having one or more epoxy radicals in the molecule and unsaturated monocarboxylic acids, and if desired, part of the unsaturated monocarboxylic acids can be replaced with at least one of members selected from the group consisting of saturated monocarboxylic acids, saturated polycarboxylic acids, their anhydrides, unsaturated polycarboxylic acids, their anhydrides, saturated alkyds having the terminal carboxyl radical or radicals and unsaturated alkyds having the terminal carboxyl radical or radicals. It is noted that the reaction between the reactants can be carried out by heating the reactants in the presence of an esterification catalyst and if desired, a polymerization inhibitor, a solvent and a polymerizable monomer may be added in the reaction system or the reaction products may be mixed with the solvent or the polymerizable monomer after the reaction is finished.

The unsaturated epoxy-ester resinous compositions used in this invention can be cured at room temperature or elevated temperatures by using an organic peroxide in the presence or absence of a polymerization accelerator as in the case of the curing of an unsaturated polyester resin which is produced by reacting a polyhydric alcohol with a polycarboxylic acid and then mixing the resultant product with a polymerization inhibitor and a polymerizable monomer. The curability of the unsaturated epoxy-ester resinous compositions can be free controlled by adjusting the amount of the organic peroxides and the polymerization accelerators as disclosed in the above mentioned Japanese Patent Publications.

It is sufficient to have a pot life or preservability of less than about 60 minutes when the unsaturated epoxy-ester resinous compositions are cured at room temperature for producing a shaped article by using the usual techniques but the pot life is not satisfied at the present time for producing a large sized article and therefore a prolonged pot life is requested for such a resinous composition. Also, when the unsaturated epoxy-ester resinous compositions are cured at elevated temperatures by using the organic peroxides only, it is a matter of course to use the polymerization accelerators together with the organic peroxides for curing such a resinous composition for a short period of time and therefore it is impossible to impart the prolonged pot life to the unsaturated epoxy-ester resinous compositions. In accordance with the prior known techniques for imparting the prolonged pot life to the unsaturated epoxy-ester resinous compositions, they are mixed with the polymerization inhibitors or a small amount of the organic peroxides and the polymerization accelerators. Such prior known techniques, however, are not preferable because the unsaturated epoxy-ester resinous compositions are not completely cured and the grade and quality of the cured products are decreased. Also when the unsaturated epoxy-ester resinous compositions containing a small amount of the organic peroxides and the polymerization accelerators are used as the lining materials which are requested to have the drying property on the surface of the cured linings, the drying property of such a catalyzed resinous composition tends to become poor. For removing such a defect from the catalyzed resinous composition, it is mixed with a paraffin wax but the paraffin wax loses its effect when the unsaturated epoxy-ester resinous compositions have the prolonged pot life.

The inventors have investigated for various methods for curing the unsaturated epoxy-ester resinous compositions which is completely cured even if they have the prolonged pot life and as the results we have found a method for curing the unsaturated epoxy-ester resinous compositions by using a curing system comprising (1) an organic peroxide, (2) an organic metal salt and (3) an imide compound. By using the curing system, the paraffin wax-containing unsaturated epoxy-ester resinous compositions are improved in their drying property and also the resulting curved products have their quality equal to the quality of the cured products which are produced by curing the unsaturated epoxy-ester resinous compositions by using the usual curing systems or techniques in or by which an organic peroxide and an organic metal salt are incorporated or used.

It is also noted that the pot life of the unsaturated epoxy-ester resinous compositions can be shortened by adjusting the proportions of the organic peroxide, the organic metal salt and the organic imide compound in the same manner as in the cases of the usual curing systems. Therefore, it is the characteristics of the curing system used in this invention that the curing system can impart the shortened pot life and the prolonged pot life to the unsaturated epoxy-ester resinous compositions.

Thus, it is understood that the method for curing the unsaturated epoxy-ester resinous compositions is characterized in that the organic imide compound is incorporated with the usual curing system comprising the organic peroxide and the organic metal salt. In accordance with the method of this invention, the pot life of the unsaturated epoxy-ester resinous compositions can be prolonged by adjusting the amount of the organic metal salt and the organic imide compound without decreasing the amount of the organic peroxide and therefore it is recognized that the organic imide compound displays the unexpected and excellent actions and effects. The reasons why the organic imide compound can display such excellent actions and effects can not be fully explained but it is considered that the actions and effects of the organic imide compound are derived from a complex compound of the metal contained in the organic metal salt and the organic imide compound. Also, it is considered that the complex compound acts as a kind of an accelerator when it is decomposed by adding the organic peroxide in the reaction system. It is also noted that the curing system used in this invention has an additional characteristics for curing the unsaturated epoxy-ester resinous composition at a low temperature.

The organic imide compounds used in this invention are not good compatible with the unsaturated epoxy-ester resinous compositions and therefore it is preferable to use the organic imide compounds by dissolving them in a polar solvent in the point of view of the workability.

As you can see from the foregoing, the unsaturated epoxy-ester resinous compositions used in this invention are produced by reacting an epoxy compound having one or more epoxy radicals in the molecule with an unsaturated monocarboxylic acid, part of which may be replaced with at least one of elements selected from the group consisting of saturated monocarboxylic acids, saturated polycarboxylic acids, their anhydrides, unsaturated polycarboxylic acids, their anhydrides, saturated alkyds having the terminal carboxyl radical or radicals and unsaturated alkyds having the terminal carboxyl radical or radicals, under heating by using an esterification catalyst in the presence or absence of a polymerization inhibitor, a solvent and a polymerizable monomer, and if desired, the reaction product may be mixed with the solvent or the polymerizable monomer after the reaction is finished. In such a reaction system, it is possible to use the carboxylic acids in an amount more than 0.1 mol of the total carboxylic radicals of the carboxylic acids used per mole of the epoxy radical of the epoxy compound having one or more epoxy radicals and it is preferable to use the carboxylic acids in an amount ranging from 0.2 to 2 moles of the total carboxylic radicals per mole of the epoxy radical of the epoxy compound in the point of view of the curability and quality of the unsaturated epoxy-ester resinous compositions. The amount of the polymerization inhibitor, the solvent or the polymerizable monomer can be varied depending on the curability, workability and quality of the unsaturated epoxy-ester resinous compositions required in use.

The epoxy compounds used for synthetizing the unsaturated epoxy-esters are classified as follows:

1. Epoxy compounds which are produced by reacting a bis-phenol A with epichlorohydrine and indicated by the formula:

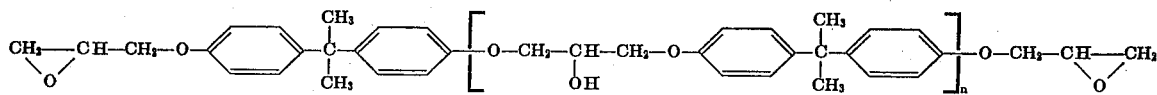

Examples of such epoxy compounds are listed as follows:

| Makers | Trade names | | Melting point(°C) | Viscosity at 25°C(poise) | Epoxy-equivalent | Molecular weight (approximate) |
|---|---|---|---|---|---|---|
| | Epikote | -827 | Liquid | 90–110 | 180– 190 | — |
| | 828 | Liquid | 120–150 | 184– 194 | 380 | |
| | 834 | Liquid | — | 230– 270 | 470 | |
| | 1001 | 64– 74 | — | 450– 500 | 900 | |
| Shell | 1004 | 96–104 | — | 900–1000 | 1400 | |
| | 1007 | 122–131 | — | 1750–2100 | 2900 | |
| | 1009 | 144–158 | — | 2400–3300 | 3750 | |
| | Araldite GY-250 | | Liquid | 90–110 | 180– 190 | — |
| | Araldite GY-260 | | Liquid | 120–160 | 180– 200 | 380 |
| Ciba | Araldite GY-280 | | Liquid | — | 225– 280 | — |
| | Araldite GY-6071 | | 64– 74 | — | 450– 500 | 900 |
| | Araldite GY-6084 | | 96–104 | — | 900–1000 | 1400 |
| | Araldite GY-6099 | | 140–154 | — | 2000–3500 | 3750 |
| | ERL | -2772 | Liquid | 70– 90 | 175–185 | — |
| Union | 2774 | Liquid | 110–135 180–195 | | | |
| Carbide | 2002 | 65– 75 | — | 450–520 | — | |
| | DER 330 | Liquid | 0970–100 182–189 | | | |
| | 331 | Liquid | 110–140 186–192 | | | |
| Dow | 332 | Liquid | 40– 0964 | 172–176 | — | |
| Chemical | 661 | 70– 80 | — | 475–575 | — | |
| | 664 | 135–155 | — | 3500–5500 | — | |

2. Epoxy compounds which are produced by reacting a bis-phenol A with methyl epichlorohydrine and indicated by the formula:

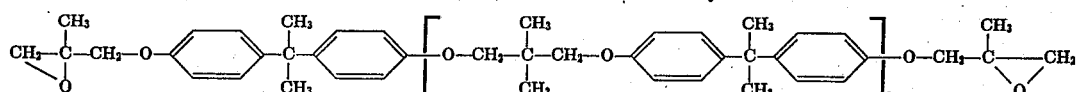

Examples of such epoxy compounds are listed as follows:

| Makers | Trade names | Melting point(°C) | Viscosity at 25°C(poise) | Epoxy-equivalent |
|---|---|---|---|---|
| Dainihon Inki | Epiclon-800 | Liquid | 250–750 | 195–225 |
|  | Epiclon-1000 | 63–75 | — | 450–525 |
|  | Epiclon-4000 | 90–100 | —· | 750–900 |

3. Epoxy compounds which are produced by reacting Novolaks with epichlorohydrine and indicated by the formula:

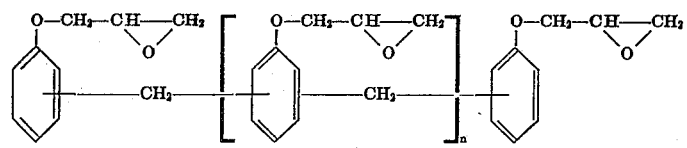

Examples of such epoxy compounds are listed as follows:

| Makers | Trade names | Melting point(°C) | Viscosity at 25°C(poise) | Epoxy-equivalent | n |
|---|---|---|---|---|---|
| Dow chemical | DEN-431 | Liquid | 14–20 | 172–179 | 0.2 |
|  | 438 | Liquid | 300–900 | 175–182 | 1.6 |
|  | 448 | 87–95 | — | 225–250 | — |
| Ciba | Araldite-1235 | 35 | — | 200 | — |
|  | Araldite-1273 | 73 | — | 225 | — |
|  | Araldite-1280 | 80 | — | 230 | — |
|  | Araldite-1290 | 99 | — | 235 | — |

4. Epoxy compounds which are produced by reacting glycols with epichlorohydrine and indicated by the formula:

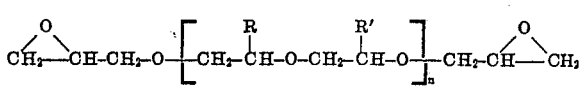

Examples of such epoxy compounds are DER-732 (epoxy-equivalent = 305 – 335 and $n = 5.6$) and DER-736 (epoxy-equivalent = 175 – 205 and $n = 3.0$) which is the Trade name and sold by Dow Chemical Co.

5. Epoxy compounds which are produced by reacting halogenated bis-phenol with epichlorohydrine and indicated by the formula:

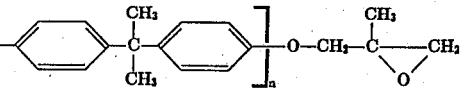

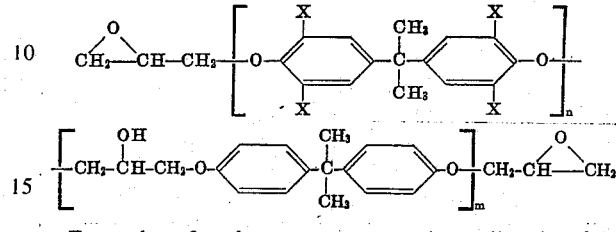

Examples of such epoxy compounds are listed as follows:

| Makers | Trade names | Melting point(°C) | Viscosity at 25°C(poise) | Epoxy-equivalent | Bromine (%) |
|---|---|---|---|---|---|
| Dow Chemical | DER-511 | 68–80 | — | 445–520 | 18–20 |
|  | -542 | 51–61 | — | 350–400 | 44–48 |
|  | -580 | Liquid | 50 | 214–221 | 16–18 |
|  | Araldite-8011 | 70–80 | — | 455–500 | 19–23 |
| Ciba | Araldite-8047 | — | 3.5(at70°C) | 223–246 | 18–22 |

6. Epoxy compounds which are produced by oxidizing the double bond of unsaturated compound and classified into "Unox — 201" having the formula of

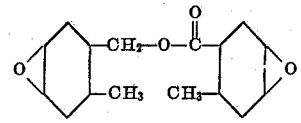

(liquid, viscosity = 18 – 22 poises at 25°C and epoxy-equivalent = 152 – 160), "Unox — 221" having the formula of

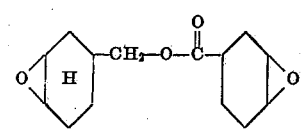

(liquid, viscosity = 4.5 – 6.0 poises at 25°C and epoxy-equivalent = 134 – 140), "Unox — 206" having the formula of

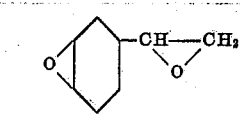

(liquid, Viscosity = 0.06 – 0.08 poises at 25°C and epoxy-equivalent = 74 – 78) and "Unox — 207" having the formula of

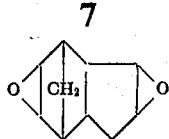

(melting point = 35° – 50°C and epoxy-equivalent = 82 – 92) which are the Trade names and sold by Union Carbide Company, and "Araldite CY-175 and - 176" having the formula of

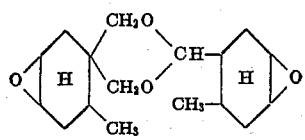

(liquid and epoxy-equivalent =]147 and 177) which are the Trade names and sold by Ciba Company.

Examples of such epoxy compounds are "A deka EP-4000" and "Adeka EP-4001" which are the Trade names and sold by Asahi Denka in Japan. The "Adeka EP-4000" is a liquid and has the viscosity of 30 to 40 poises at 25°C and the epoxy-equivalent of 330 to 360, and the "Adeka EP-4001" is a liquid and has the viscosity of 50 to 60 poises at 25°C and the epoxy-equivalent of 250 to 280.

9. Epoxy compounds which are produced by reacting carboxylic acids with epichlorohydrine or methyl epichlorohydrine and indicated by the formula:

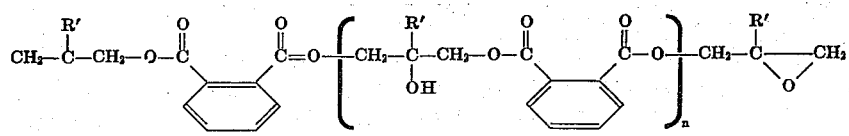

Examples of such epoxy compounds are listed as follows:

| Makers | Carboxylic acids | Trade names | State of | Viscosity at 25°C(poise) | Epoxy-equivalent |
|---|---|---|---|---|---|
| Nihon-Kayaku | Phthallic acid | AK-737 –838 | Liquid Liquid | 40 – 100 15 – 65 | 200 – 230 180 – 200 |
| Dai-nihon-Inki | Phthallic acid | Epiclon-200 | Liquid | 13 – 45 | 160 – 200 |
| Dai-nihon-Inki | Methyl-tetra-hydro-phthallic acid anhydride | Epiclon-300 | Liquid | 7.7 | 180 – 200 |
| | Hexahydro-phthallic acid anhydride | Epiclon-400 | Liquid | 4.5 – 10 | 170 – 210 |

7. Epoxy compounds which are designated as "Oxiron" and sold by FMC in U.S.A., and indicated by the formula:

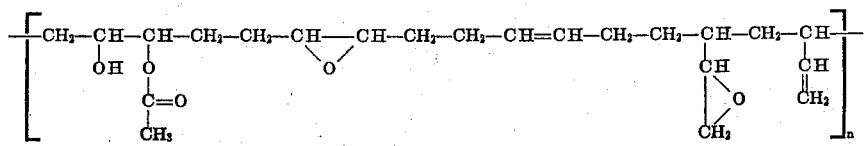

Examples of the "Oxiron" are "Oxiron-2000" which is a liquid and has the viscosity of 1800 poises at 25°C and the epoxy-equivalent of 177, "Oxiron — 2001" which is a liquid and has the viscosity of 160 poises at 25°C and the epoxy-equivalent equivalent of 145 and "Oxiron — 2002" which is a liquid and has the viscosity of 15 poises at 25°C and the epoxy-equivalent of 232.

8. Epoxy compounds which are produced by reacting an adduct of bisphenol A and ethylene oxide or propylene oxide with epichlorohydrine and indicated by the formula:

Further, it is noted that a certain reaction product which is produced by reacting an epoxy compound with bis-phenol can be used as the epoxy compound for producing the unsaturated epoxy-esters.

The unsaturated monocarboxylic acids used in this invention include, for example, acrylic acid, methacrylic acid and crotonic acid. It is possible to use the mono-esters of the unsaturated polycarboxylic acids such as a mono-ethyl ester of maleic acid. Also the unsaturated monocarboxylic acid can be used in combination with the mono-ester of the unsaturated polycarboxylic acid.

Examples of the saturated monocarboxylic acids, the saturated polycarboxylic acids, their anhydrides, the unsaturated polycarboxylic acids and their anhydrides

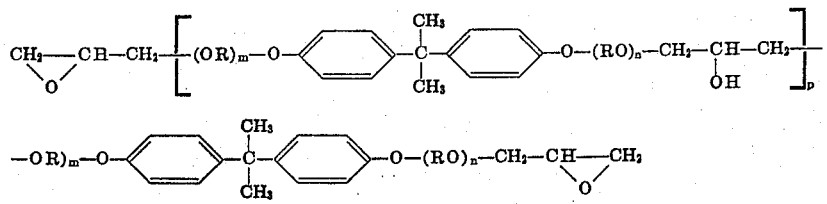

(R = ethylene or propylene radical)

used in this invention are acetic acid, benzoic acid, maleic acid, maleic acid anhydride, fumaric acid, citraconic acid, itaconic acid, tetrachlorophthalic acid anhydride, Het acid, tetrobromophthalic acid anhydride, phthalic acid, isophthalic acid, terephthalic acid, endomethylene tetrahydrophthalic acid anhydride, tetrahydrophthalic acid anhydride, hexahydrophthalic acid anhydride, succinic acid, adipic acid, azelaic acid, sebacic acid, an adduct of anthracene and maleic acid anhydride, an adduct or rosin and maleic acid anhydride, glutaric acid, an adduct of cyclopentadiene and unsaturated carboxylic acid, trimellitic acid anhydride, pyromellitic acid anhydride.

It is noted that the saturated alkyds having the terminal carboxyl group or groups can be synthetized by reacting a polyhydric alcohol with the saturated polycarboxylic acid which is used in a mole ratio of from 1.01 to 5 moles per mole of the polyhydric alcohol, and also that the unsaturated alkyds having the terminal carboxyl group or groups can be synthetized by reacting the polyhydric alcohol with the unsaturated polycarboxylic acid which is used in a mole ratio of from 1.01 to 5 moles per mole of the polyhydric alcohol. The starting saturated and unsaturated carboxylic acids used in such a synthesis include maleic acid, maleic acid anhydride, fumaric acid, citraconic acid, itaconic acid, tetrachlorophthalic acid anhydride, Het acid, tetrabromophthalic acid anhydride, phthalic acid, isophthalic acid, terephthalic acid, endomethylene tetrahydrophthalic acid anhydride, tetrahydrophthalic acid anhydride, hexahydrophthalic acid anhydride, succinic acid, adipic acid, azelaic acid, sebacic acid, an adduct of anthracene and maleic acid anhydride, an adduct of rosin and maleic acid anhydride, glutaric acid, an adduct of cyclopentadiene and unsaturated carboxylic acid, and trimellitic acid anhydride. The starting polyhydric alcohols include ethylene glycol, glycerine, propylene glycol, butane-diol-1,4, butane-diol-1,3, butane-diol-2,3, diethylene glycol, dipropylene glycol, triethylene glycol, pentane-diol-1,5, hexane-diol-1,6, neopenthyl glycol, 2,2,4-trimethyl-pentane-diol-1,3, hydrogenated bisphenol-A, 2,2-di-(4-hydroxy-propoxy phenyl) propane, trimethylene glycol, pentaerythritol and 2-ethyl-1,3-hexane-diol.

It is noted that the saturated and unsaturated alkyds can be modified with a monohydric alcohol or a monocarboxylic acid.

Examples of the polymerization inhibitors are hydroquinone, p-tertiary butyl catechol, methoxyhydroquinone, benzoquinone and a copper salt.

Examples of the copolymerizable monomers used in this invention are esters of acrylic acid such as ethylacrylate, hydroxy-propylacrylate and butylacrylate; esters of methacrylic acid such as methyl-methacrylate, cyclohexyl-methacrylate, lauryl-methacrylate and 2-hydroxy-ethyl-methacrylate; vinyl benzene, vinyl toluene, acrylonitrile, methacrylonitrile, cyclopentadiene, divinyl benzene, vinyl pyridin, vinyl acetate, diallylphthalate, polyfunctional acrylic or methacrylic compounds such as ethylene glycol-diacrylate, trimethylolpropane-trimethacrylate and polyethylene glycol-dimethacrylate, chlorostyrene and α-methylstyrene. It is noted that such copolymerizable monomers can be used alone or in combination thereof.

The esterification catalyst used in this invention includes primary, secondary and tertiary amines; their inorganic or organic acid salts; quaternary ammonium salts; phosphonium salts; sulfonium salts; Lewis acids; adducts of Lewis acids and organic compounds; metal halides; metal hydroxides; hydrogen halides; and alkyl titanates. Examples of the esterification catalysts are n-butylamine, dimethylamine hydrochloride, triethylamine, tetramethylammonium chloride, triphenylsulfonium chloride, triphenylmethylphosphonium iodide, boron trichloride, trifluoroboronmonoethylamine, lithium chloride, butyltitanate, triphenylphosphine and triphenyl antimonate. It is noted that such esterification can be used alone or in combination thereof.

Examples of the solvents used in this invention are benzene, ethyl alcohol, dipropyl ketone, ethyl acetate, dicarbitol, butyl lactate, diacetone alcohol, isopropyl cellosolve, petroleum, acetal ethylether, aceto-acetic acid and cellosolve acetate, and it is noted that such solvents can be used alone or in combination thereof. The organic peroxides used in this invention include ketone peroxide, hydroperoxide, dialkyl peroxide, diacyl peroxide, peroxyester and other peroxides, and it is noted that such organic peroxides can be used alone or in combination thereof.

The organic metal salts used in this invention include metal salts of naphthenic acid, octoic acid, soy-bean fatty acid, linsed fatty acid and tall oil-acid. Examples of such metal salts are cobalt naphthenate, cobalt octoate, cobalt linoleate, cobalt tallate and manganese tallate.

The organic imide compounds used in this invention include organic compounds having an imide group indicated as follows:

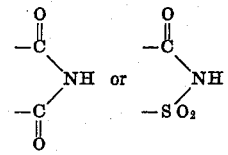

Examples of such organic imide compounds are phthalimide, ortho-sulfobenzimide and benzoic sulfimide, and it is noted that such imide compounds can be used alone or in combination thereof.

It is noted that the organic peroxide is mixed in an amount of from 0.01 to 10 weight parts with 100 weight parts of the unsaturated epoxy-ester resinous composition and it is preferable to mix the organic peroxide in an amount of from 0.01 to 3 weight parts with 100 weight parts of the unsaturated epoxy-ester resinous composition.

Also, it is noted that the organic metal salt is mixed in an amount of from 0.001 to 10 weight parts with 100 weight parts of the unsaturated epoxy-ester resinous composition and it is preferable to use the organic metal salt in an amount of from 0.01 to 3 weight parts.

Further, it is noted that the organic imide compound is mixed in an amount of from 0.001 to 10 weight parts with 100 weight parts of the unsaturated epoxy-ester resinous composition and it is preferable to use the organic imide compound in an amount of from 0.01 to 3 weight parts.

Still further, it is noted that in accordance with this invention, the unsaturated epoxy-ester resinous composition may be mixed with reinforcing materials, inorganic or organic fillers and pigments if desired.

It should be understood that this invention can be modified without departing from the spirit of this invention and it is illustrated by the following Examples.

EXAMPLE 1

1. Preparation of an unsaturated epoxy-ester resinous composition-(A)

1900 weight parts of "Epikote 828" which is the Trade mark and sold by Shell Company, 860 Weight parts of methacrylic acid, 11 weight parts of dimethylamine hydrochloride and 0.82 weight part of hydroquinone were charged in a 3 liters flask equipped with a stirrer, a reflux condenser and a thermometer. Then the flask was heated on an oil bath at 120°C for 2 hours to produce an unsaturated epoxy-ester having the acid values of 10. 70 weight parts of the unsaturated epoxy-ester were mixed with 30 weight parts of styrene to produce the unsaturated epoxy-ester resinous composition-(A) having the viscosity of 3.2 poises at 25°C.

2. Preparation of an imide-containing solution-(A)

30 weight parts of ortho-sulfobenzimide were dissolved in 70 weight parts of dimethylformamide to produce the imide-containing solution-(A).

3. Organic peroxide and metal salt

Cumene hydroperoxide having the purity of 73 percent was used as the organic peroxide and a cobalt naphthenate solution containing a 6 percent of cobalt was used as the organic metal salt.

Now the imide-containing solution-(A) was mixed with the unsaturated epoxy-ester resinous composition-(A) and to the resultant mixture the cobalt naphthenate solution was added and then the cumene hydroperoxide was added to produce test samples. The test samples were tested for the pot life at 25°C. The test results are given in the following Table in which a comparative test result is indicated.

| Nos. of Test Samples | 1 | 2 | 3 | 4 | 5 | 6 |
|---|---|---|---|---|---|---|
| Resinous composition-(A)(wt part) | 100 | 100 | 100 | 100 | 100 | 100 |
| Cumene hydroperoxide(wt part) | 1.0 | 1.0 | 1.0 | 1.0 | 1.5 | 1.5 |
| Cobalt naphthenate solution (wt part) | 0.5 | 0.5 | 1.0 | 0.5 | 0.5 | 0.5 |
| Imide-containing solution-(A) (wt part) | — | 0.5 | 1.0 | 1.5 | 1.0 | 1.5 |
| Pot life (minutes) | 28 | 21 | 40 | 101 | 35 | 73 |

EXAMPLE 2

148 weight parts of phthalic acid anhydride, 687 weight parts of methacrylate, 1900 weight parts of "Araldite GY 250" which is the Trade mark and sold by Ciba Company, 8.2 weight parts of triethylamine and 0.54 weight part of hydroquinone were charged in a 3 liters flask which was used in Example 1 and the content of the flask was heated in the same manner as in Example 1 to produce an unsaturated epoxy-ester. 70 weight parts of the unsaturated epoxy-ester were mixed with 30 weight parts of styrene to produce an unsaturated epoxy-ester resinous composition-(B) having the viscosity of 8 poises at 25°C. By using the unsaturated epoxy-ester resinous composition-(B), test samples were prepared in the same manner as in Example 1. The test samples were tested for the pot life at 25°C. The test results are given in the following Table in which a comparative test result is shown.

| Nos. of Test Samples | 7 | 8 | 9 | 10 | 11 |
|---|---|---|---|---|---|
| Resinous composition-(B)(wt part) | 100 | 100 | 100 | 100 | 100 |
| Cumene hydroperoxide(wt part) | 1.0 | 1.0 | 1.0 | 1.5 | 1.5 |
| Cobalt naphthenate solution (wt part) | 0.5 | 0.5 | 0.5 | 0.5 | 0.5 |
| Imide-containing solution-(A) (wt part) | — | 1.5 | 1.5 | 1.0 | 1.5 |
| Pot life (minutes) | 26 | 70 | 306 | 45 | 280 |

EXAMPLE 3

Test samples were prepared by using the unsaturated epoxy-ester resinous composition-(B) used in Example 2 and cyclohexanone peroxide having the purity of 55 percent as an organic peroxide in combination with the cobalt naphthenate solution and the imide-containing solution-(A) which were used in Example 1. The test samples were tested for the pot life at 20°C and the test results are given in the following Table in which two comparative test results are shown.

Also the test samples were tested for the pencil hardness after they were cured at 0°C for 24 hours and the test results are given in the following Table.

| Nos. of Test Samples | 12 | 13 | 14 | 15 | |
|---|---|---|---|---|---|
| Resinous composition-(B)(wt part) | 100 | 100 | 100 | 100 | |
| Cyclohexanone peroxide(wt part) | 1.0 | 1.0 | 1.0 | 0.3 | |
| Cobalt naphthenate solution (wt part) | 0.5 | 0.25 | 0.5 | 0.2 | |
| Imide-containing solution-(A) (wt part) | 1.0 | 0.5 | — | — | |
| Pot life (minutes) | 210 | 45 | 23 | above | 60 |
| Pencil hardness on the surface of the cured product | above 5H | above 5H | above | 5H | 2H |

As you can see from the data as shown in the Table, the test samples 12 and 13 have the longer pot life as compared with the test sample 14 and each of test samples 12, 13 and 14 has the pencil hardness of above 5H. These facts show that the test samples 12 and 13 which are prepared in accordance with this invention were fully cured and nevertheless their pot life was prolonged. Also the cured products of the test samples 12 and 13 were tested for bending strength and tensile strength, and it was found that they were fully cured. Test sample 15 was prepared by using the cyclohexanone peroxide and the cobalt naphthenate in the smaller amount as in the prior known techniques and as you see from the Table the test sample 15 shows the pencil hardness of 2H. This fact shows that the test sample 15 was not fully cured after it was cured at 0°C for 24 hours.

In order to measure the pencil hardness and secure the curing of the resinous composition-(B), four glass mats having the weight of 450 grams per square meter were impregnated under heating with the resinous composition-(B) comprising 0.3 weight percent of paraffin having the melting point of 48°–50°C, 1.5 weight percent of cyclohexanone peroxide and 0.5 weight percent of the cobalt naphthenate solution and then the impregnated four glass mats were laminated and the laminated glass plate is cured at room temperature and then it was after-cured at 120°C for 2 hours in order to complete the curing of the resinous composition-(B). The laminated glass plate was tested for the pencil hardness and it was found that it has the pencil hardness of above 5H.

EXAMPLE 4

1. Preparation of a saturated alkyd

One mol of ethylene glycol was reacted with two moles of tetrahydrophathalic acid anhydride at 190°C for producing the saturated alkyd having the acid values of 250.

2. Preparation of an unsaturated epoxy-ester resinous composition-(C)

224 weight parts of the saturated alkyd, 648 weight parts of acrylic acid, 1900 weight parts of "Araldite GY 250," 10.5 weight parts of benzyl-dimethylamine, 0.5 weight part of hydroquinone and 15 weight parts of styrene were charged in a reaction vessel and the content of the reaction vessel was heated in the same manner as in Example 1 to produce an unsaturated epoxy-ester and then 1050 weight parts of an additional styrene and 50 weight parts of methylmethacrylate were charged in the reaction vessel to produce the unsaturated epoxy-ester resinous composition-(C).

3. Preparation of an imide-containing solution-(B)

10 weight parts of phthalimide were dissolved in 90 weight parts of dimethylformamide to produce the imide-containing solution-(B).

A test sample 17 was prepared by using the unsaturated epoxy-ester resinous composition-(C), cyclohexanone peroxide, a cobalt naphthenate solution containing a 6 percent of cobalt and the imide-containing solution-(B) and also a comparative test sample 16 was prepared by omitting the use of the imide-containing solution-(B). The test sample and the comparative test sample were tested for the pot life at 25°C and the test results are given in the following Table.

| Nos. of Test Samples | 16 | 17 |
|---|---|---|
| Resinous composition-(C)(wt part) | 100 | 100 |
| Cyclohexanone peroxide(wt part) | 1.0 | 1.0 |
| Cobalt naphthenate solution (wt part) | 0.5 | 0.5 |
| Imide-containing solution-(B) (wt part) | — | 4.0 |
| Pot life (minutes) | 32 | above 100 |

As you can see from the pot life of the test sample 17 and the comparative test sample 16, the organic imide compound displays an excellent effect on the pot life of the unsaturated epoxy-ester resinous composition-(C).

EXAMPLE 5

This example illustrates the actions and effects of a complex compound which is assumably produced by mixing an organic metal salt with an organic imide compound.

50 weight parts of a cobalt naphthenate solution containing a 6 percent of cobalt were mixed with 150 weight parts of the imide-containing solution-(A) as explained in Example 1 to produce a complex compound-containing admixed solution which is referred as to an admixed solution-(A).

A test sample 19 was prepared by using the unsaturated epoxy-ester resinous composition-(B) as explained in Example 2, cumene hydroperoxide and the admixed solution-(A), and also a comparative test sample 18 was prepared by using the unsaturated epoxy-ester resinous composition-(B), cumene hydroperoxide and the cobalt naphthenate solution containing a 6 percent of cobalt. The test sample and the comparative test sample were tested for the pot life at 25°C and the test results are given in the following Table.

| Nos. of Test Samples | 18 | 19 |
|---|---|---|
| Resinous composition-(B)(wt part) | 100 | 100 |
| Cumene hydroperoxide(wt part) | 1.0 | 1.0 |
| Cobalt naphthenate solution(wt part) | 0.5 | — |
| Admixed solution-(A) | — | 2.0 |
| Pot life (minutes) | 26 | above 100 |

What we claim is that:

1. In a method for curing an unsaturated epoxyester resinous composition, the improvement which consists essentially of adding to said composition (1) 0.01 to 10 weight parts of one or more organic peroxides per 100 weight parts of said composition; (2) 0.001 to 10 weight parts per 100 weight parts of said composition of one or more organic metal salts selected from the group consisting of cobalt naphthenate, cobalt octoate, cobalt linoleate, cobalt tallate and manganese tallate; and (3) 0.001 to 10 weight parts per 100 weight parts of said composition of one or more organic imide compounds selected from the group consisting of phthalimide, orthosulfobenzimide and benzoic sulfimide, which imides are added dissolved in a solvent therefor.

2. The method for curing an unsaturated epoxy-ester resinous composition according to claim 1, wherein said unsaturated epoxy-ester resinous composition is produced by reacting an epoxy compound having at least two epoxy radicals in the molecule with an unsaturated monocarboxylic acid in an amount ranging from 0.2 to 2 moles of the total carboxylic radicals per mole of the epoxy radical of the epoxy compound, and if desired, a part of said monocarboxylic acid being replaced with at least one of the elements selected from the group consisting of saturated monocarboxylic acids, saturated polycarboxylic acids, their anhydrides, unsaturated polycarboxylic acids, their anhydrides, saturated alkyds having terminal carboxyl radical or radicals and unsaturated alkyds having terminal carboxyl radical or radicals, said curing being performed under heating in the presence of an esterification catalyst and in the presence or absence of a polymerization inhibitor, a solvent and a polymerizable monomer, and if desired adding an additional solvent or an additional polymerizable monomer after the reaction is finished.

* * * * *